UNITED STATES PATENT OFFICE.

CHARLES R. HARRIS AND CHRISTOPHER C. BARRICK, OF LOS ANGELES, CALIFORNIA.

COMPOSITION OF FIREPROOF WALL-PLASTER.

SPECIFICATION forming part of Letters Patent No. 708,353, dated September 2, 1902.

Application filed February 13, 1902. Serial No. 93,922. (No specimens.)

*To all whom it may concern:*

Be it known that we, CHARLES R. HARRIS and CHRISTOPHER C. BARRICK, of Los Angeles, in the county of Los Angeles and State of California, have invented certain new and useful Improvements in Composition of Fireproof Wall-Plaster; and we do hereby declare the following to be a full, clear, and exact description of the invention, such as will enable others skilled in the art to which it appertains to make and use the same.

Our invention relates to a composition of fireproof wall-plaster for plastering all character of walls, ceilings, &c., as well as the outside of buildings, ornamental moldings, brackets, &c.

The object of the invention is to produce a composition for these purposes that will possess the requisite tenacity and strength to form a covering of practical indestructibility, but with sufficient pliancy to allow of indentations rather than fracture when coming in contact with hard surfaces.

In preparing the composition we use a base of clay, assuming that all the measures are made by avoirdupois weight. For a ton of two thousand pounds of composition we use approximately nine hundred pounds of clay, (preferably five hundred pounds ordinary plastic clay and four hundred pounds fireclay;) calcined plaster, eight hundred pounds; hydraulic cement, two hundred and fifty pounds; asbestos-pulp, forty pounds, and pulverized glue, ten pounds.

The high point of desirability to be obtained in wall-coverings is primarily cheapness, tenacious strength, a non-conductor of heat and cold, electricity, and sound, and the assurance of its being able to withstand fire and water when applied to a backing of either wood or iron; also, the possibility of being soaked with water and still retaining its strength and color when it again becomes dry. In this composition we have produced a plaster covering all these requirements, still containing no lime, sand, or acid. Consequently it can be colored, tinted, or frescoed with the most delicate of tints without any danger whatever of the ingredients contained in the plaster being detrimental to the decorations.

This composition is cheap to manufacture and produces a plaster that is hard and firm, yet not brittle or resonant, and will not warp or crack in drying, even if exposed to wind or sun. It has great adhesive qualities and will adhere to lathed, wired, or plain walls and of which a complete finish, either rough or smooth, can be produced with a single coat. Again, owing to the fact that it is about fifty per cent. clay, one of the cheapest known base materials, it is exceedingly cheap to manufacture. It will spread evenly and easily with the least possible exertion from the mechanic applying it, and on account of its composition extra long clenches can be produced without danger of the clenches breaking off, as is so common with many other plasters. It is also susceptible of being molded into any form and is of such toughness that it can be screwed or nailed into position or bored, sawed, or cut similar to wood. It will also be seen that a plaster compounded in the manner set forth can be shipped in its dry state, and, if desired, coloring matter can be mixed with it in this condition to give the walls or ceilings the tint desired.

The composition of approximately the quantities of the materials named produces the results aboved named, the calcined plaster and cement assisting in setting and hardening a large proportion of the clay, while the asbestos-pulp, in combination with the glue, acts as a binder of the mass, as well as a retarder in preventing too-rapid setting. The asbestos-pulp largely overcomes the tendency of the clay and cement to color the product, and the plaster when dry produces a nearly-white effect.

In manufacturing the plaster for the market we prefer to combine the several ingredients in the proportions above stated. However, experiments have demonstrated the fact that cheap and exceedingly good grades of plaster can be produced by varying the proportions of the several ingredients. For instance, instead of forty pounds asbestos-pulp from fifteen to fifty pounds might be used to good advantage; calcined plaster as high as one thousand pounds or as low as six hundred pounds might be used; hydraulic cement from two hundred pounds to five hundred pounds could be used, while the remaining proportions being made up of clay and glue, the latter varying from five to fifteen pounds. Where a large amount of calcium is used, a small amount of cement, and vice versa. Clay should not exceed one-half of the total, and in a mass of two thousand pounds of the composition five hundred pounds could be used with fair success; but we would have it understood that we do not confine ourselves to the proportions named, as the invention comprehends the employment of the ingredients named or their equivalents, which will when combined produce a plaster having the characteristics above set forth.

By the term "calcined plaster" we mean raw gypsum, burned and ground.

Having fully described our invention, what we claim, and desire to secure by Letters Patent of the United States, is—

1. The herein-described composition of matter, consisting of clay, calcined plaster, cement, asbestos fiber and glue, substantially as described and for the purpose specified.

2. A dry powder for plaster consisting of clay, calcined plaster, cement, asbestos fiber and glue, in substantially the proportions stated.

3. A dry powder for plaster consisting of clay, calcined plaster, cement, asbestos fiber and glue in substantially the proportions stated and coloring-matter.

In testimony whereof we have signed this specification in the presence of two subscribing witnesses.

CHAS. R. HARRIS.
CHRISTOPHER C. BARRICK.

Witnesses:
H. S. G. McCARTNEY,
R. E. PERCIVAL.